(12) United States Patent
Tajiri et al.

(10) Patent No.: US 6,886,027 B2
(45) Date of Patent: Apr. 26, 2005

(54) COMMUNICATION APPARATUS WITH ADDRESS TRANSLATION FOR MULTIMEDIA COMMUNICATION IN DIFFERENT ADDRESS SPACES AND MULTIMEDIA COMMUNICATION METHOD COMPATIBLE WITH ADDRESS TRANSLATION

(75) Inventors: Katsutoshi Tajiri, Tokyo (JP); Takashi Noda, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 730 days.

(21) Appl. No.: 09/986,195

(22) Filed: Nov. 7, 2001

(65) Prior Publication Data

US 2002/0059455 A1 May 16, 2002

(30) Foreign Application Priority Data

Nov. 13, 2000 (JP) .......................... 2000-345034

(51) Int. Cl.[7] .............................................. G06F 13/00
(52) U.S. Cl. ................... 709/202; 709/245; 370/351
(58) Field of Search ............................... 709/200–203,
709/217–219, 223–225, 238–240, 245;
370/235, 252, 351–356

(56) References Cited

U.S. PATENT DOCUMENTS 6,081,524 A * 6/2000 Chase et al. ................. 370/389
6,097,719 A * 8/2000 Benash et al. ............... 370/352
6,377,990 B1 * 4/2002 Slemmer et al. ............. 709/225
6,615,357 B1 * 9/2003 Boden et al. ................ 713/201
6,650,631 B1 * 11/2003 Benash et al. ............... 370/352
6,650,641 B1 * 11/2003 Albert et al. ................ 370/392
6,717,949 B1 * 4/2004 Boden et al. ................ 370/401

FOREIGN PATENT DOCUMENTS

| JP | 10-257105 | 9/1998 |
| JP | 10-289170 | 10/1998 |
| JP | 2000-59430 | 2/2000 |

* cited by examiner

*Primary Examiner*—Moustafa M. Meky
(74) *Attorney, Agent, or Firm*—Venable LLP; Michael A. Sartori

(57) ABSTRACT

A multimedia communication apparatus includes a system controller which determines how to process, during call processing, destination information received from a user controller based on information from a data storage, sets a global address or a private address in the call message according to the determination result, and sends out the call message through a LAN interface. Therefore, during negotiation between terminals that is performed by the system controller in response to a response from a remote terminal, the address that is set in the call message may be used for the address of the call terminal even in a different address space.

11 Claims, 9 Drawing Sheets

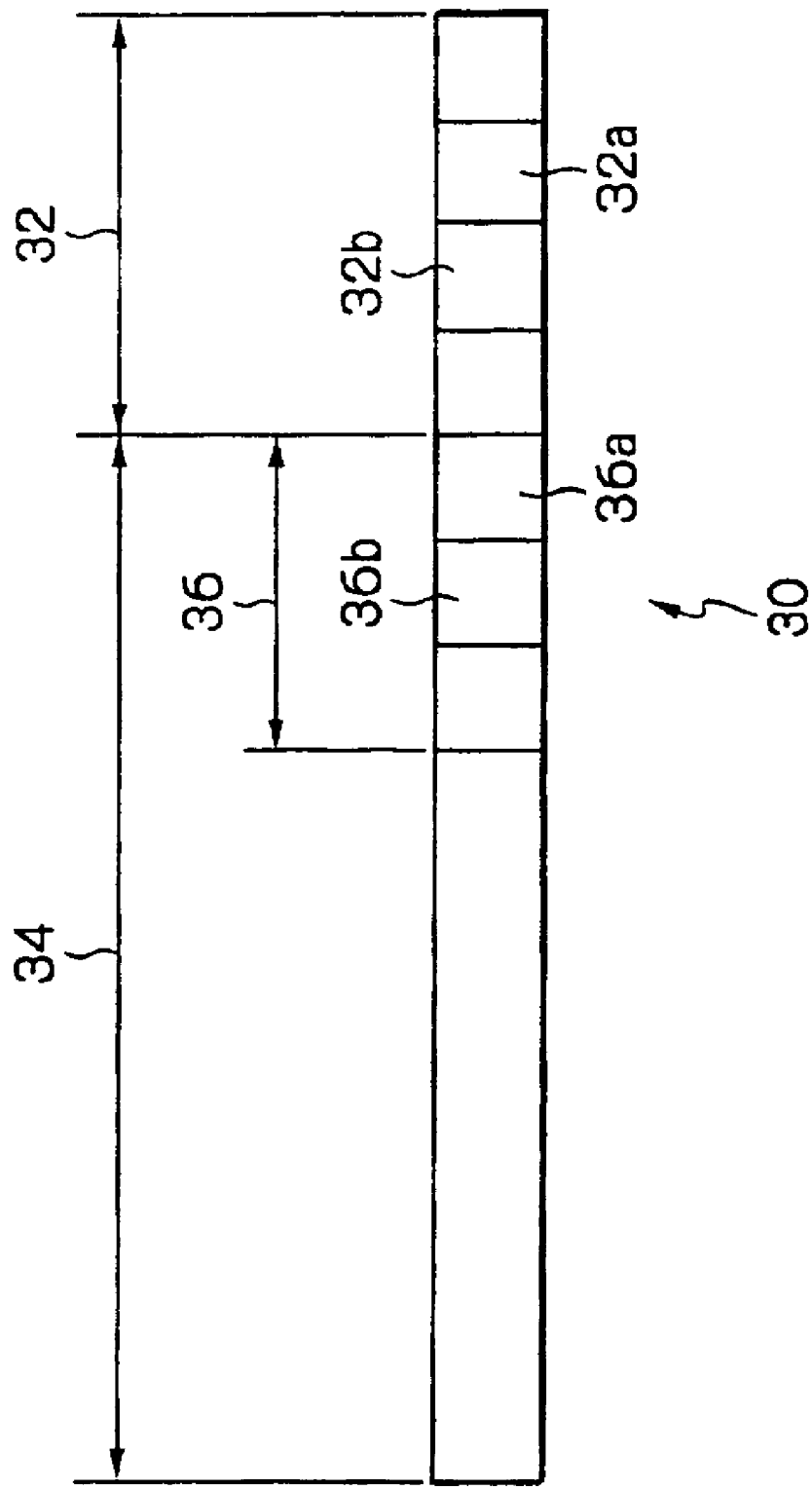

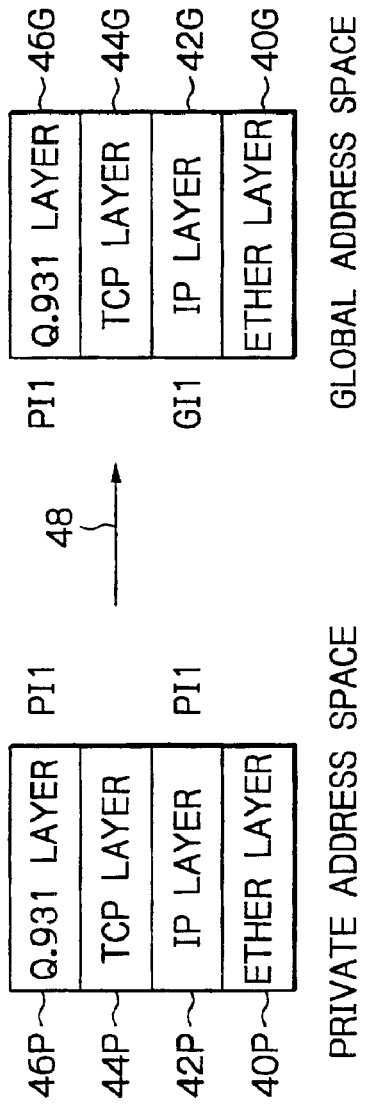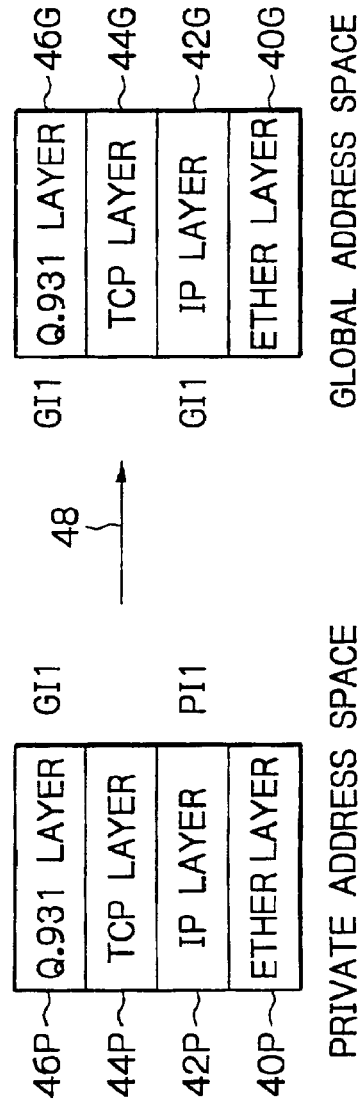

COMMUNICATION APPARATUS WITH ADDRESS TRANSLATION FOR MULTIMEDIA COMMUNICATION IN DIFFERENT ADDRESS SPACES AND MULTIMEDIA COMMUNICATION METHOD COMPATIBLE WITH ADDRESS TRANSLATION

BACKGROUND OF THE INVENTION

1. Field of the Invention

The present invention relates to a communication apparatus with the address translation function and to a multimedia communication method. For example, the present invention is suitable for use in communication, especially multimedia communication and so forth, which involves address translation on an IP (Internet Protocol) network.

2. Description of the Background Art

In general, an IP address assigned to each user to uniquely identify a host on the Internet is called a global address. In contrast, an IP address used freely on a network closed in an organization, such as a corporate or user's promises network, is called a private address.

An IP address, a 32-bit numeric value, has a limit on the number of connections. The IP address translation technology is used for overcoming the problem of IP address insufficiency caused by the limit on the number of connections. IP address translation refers to the NAT (Network Address Translation) function, a function defined by RFC1631 for translating between a private address and a global address. RFC, an abbreviation for Request For Comments, is a sequence of documents organized by Internet technology standardization body named IETF (Internet Engineering Task Force).

For example, a NAT-compatible router translates an IP address, owned by a plurality of clients, to a global address and supplies the translated address to a server. Therefore, the server does not know the IP address (private address) of the client from which an actual request is made. As a result, a client machine appears as if it were on a corporate or client's promises network at the router-translated IP address.

A response is sent from the server to the translated global address. Upon receiving the response, the NAT-compatible router reads out the IP address in the corporate LAN (Local Area Network) associated with the global address and, with the private address as the destination IP address, sends out the response.

A NAT-compatible router acquires global addresses in advance and uses the corresponding IP addresses for communication. The NAT-compatible router has a correspondence table (NAT table) that contains the correspondence between client IP addresses before translation and global addresses used by the router. Upon receiving a response from a server, the router references this correspondence table to find out the IP address of the client to which the response is to be sent (see RFC1631).

Note that, if a client does not issue an access request for a predetermined time, the global address that has been used for this client is made available for access by other clients. This allows a plurality of clients to share one global address. If all IP addresses acquired by this router are used up, an access request from some other client is discarded.

It is apparent from the above description that the NAT establishes one to one correspondence between private addresses and global addresses. This means that as many clients as the router global addresses may access the Internet at the same time.

There is another IP address translation function that translates not only an IP address but also a source client port number to allow a plurality of clients, each with its own private address, to share one global address. This function is called an IP masquerade. In RFC2663, the function equivalent to the masquerade function is called NAPT (Network Address Port Translation). A port number refers to a number used to identify an application running on one computer. From the server side, it appears as if a plurality of applications were running on one client.

Consider how a call operation is performed when a client communicates with a server through a router with the NAT/IP masquerade function. In response to a call message from a client that includes a private address and a receiving port number, the router translates the IP address and sends the message to the server.

In the description below, a general multimedia device is considered as a device that performs multimedia communication based on ITU-T (International Telecommunication Union-Telecommunication Standardization Sector) Recommendation H.323 (Ver. 2, February 1998) on a non-telephonic signal transmission line. However, in this case, IP address translation is performed via the NAT only for the header information in a call message, that is, only for the header information at the transport layer or below. NAT translation is not performed for a client IP address (local device information) stored in the data part of the call message that is at a layer higher than the transport layer.

By transmitting and receiving calling and responding messages, a server and a client open a connection for negotiation or obtain the destination IP address and the port number for multimedia data transmission and reception. The port number used in this case is a value different from the port number for controlling a call. More specifically, although the IP address and the port number in this case are transmitted between devices in the form of calling/responding messages, address translation is not performed for the IP address nor the port number in the data area in those messages. Therefore, because a reference is made to the destination IP address (more specifically, private address and port number), a connection for negotiation cannot be opened or multimedia data transmission cannot be performed for the client indicated by the IP address and the port number stored in the data.

When using an application that records a response destination address in the data part of an IP packet, normal communication cannot be established through the NAT.

SUMMARY OF THE INVENTION

It is an object of the present invention to provide a communication apparatus with the address translation function and a multimedia communication method that solve the problems with the prior art described above. This address translation function makes multimedia communication possible between one and another devices in a different address space on a network, for example, between a device at a global address and a device at a private address.

To solve the above problems, the present invention provides a communication apparatus with an address translation function located between terminals, which communicate over an IP (Internet Protocol) network, for processing different types of data for communication, wherein in the IP network an address uniquely identifying a called party is a first address and an address used in a closed network is a second address, the apparatus comprising a first control circuit that sends destination information indicating a destination and a call instruction, which are included in the data, and a reception instruction; an information storage that stores therein the first address to which the second address is made to correspond with IP address translation, information indicating which address, first or second, is to be set in the call instruction and the reception instruction, and port information used for identifying applications; a second control circuit that determines which address, first or second, is set as a destination address in a call message generated based on information read out from the information storage and that performs control according to a standard; a codec circuit that performs codec processing for supplied data; and an interface circuit that connects the IP network to the apparatus.

In accordance with the communication apparatus with an address translation function of the present invention, the second control circuit determines how to process destination information, sent from the first control circuit, based on information from the information storage, sets the first or second address in the call message based on the result, and sends out the call message from the second control circuit through the interface circuit. Therefore, during the negotiation between terminals in response to a response from a remote terminal, the apparatus can perform negotiation correctly considering the address of the terminal from which the call message was issued.

Also, to solve the above problems, the present invention provides a multimedia communication method of processing different types of data over an IP network and for performing a plurality of types of data communication between terminals while using an IP address translation function, wherein in the IP network an address uniquely identifying a called party is a first address and an address used in a closed network is a second address, the method comprising a first step of setting destination information of a call destination, one of the terminals being the call destination; a second step of determining if address translation is to be performed for an address included in a call message created based on the destination information; a third step of determining if the determined destination is represented by the first address or the second address; a fourth step of setting an IP address, produced by the address translation, in local device information unique to the terminal when the determined result indicates the first address; a fifth step of setting the local device information when the determined result indicates the second address; a sixth step of sending the call message set up in the above steps; a seventh step of checking if a response message is received from another terminal; an eighth step of performing negotiation between the terminals in response to the reception; a ninth step of checking if the negotiation is successful; a tenth step of communicating data between the terminals when the negotiation is successful and for performing codec processing on the data sent or received; and an eleventh step of releasing the call if, after completion of the communication, the response message was not received or the negotiation failed.

The multimedia communication method of the present invention sets destination information, determines if address translation is to be performed for the address in a call message based on the destination information, and determines if the determined destination is represented by the first address or the second address. Based on the determined result, the method sets an IP address, which has been translated, in the local information unique to the terminal, sets the local information itself if the determination result indicates the second address, and then sends the call message. In response to a response message, the method performs negotiation between terminals, communicates data between terminals if the negotiation is successful while performing codec processing on the data sent or received, and releases the call after completion of communication. Because the method sends the call message with an actually used address as the first or the second address, the terminals are made to correspond correctly and the negotiation is secured.

BRIEF DESCRIPTION OF THE DRAWINGS

The objects and features of the present invention will become more apparent from consideration of the following detailed description taken in conjunction with the accompanying drawings in which:

FIG. 2 schematically shows the exemplified structure of an IP packet used by the apparatus shown in FIG. 1;

FIGS. 4A and 4B are diagrams useful for understanding the operation of a conventional multimedia communication apparatus and the operation of the apparatus shown in FIG. 1, respectively;

DESCRIPTION OF THE PREFERRED EMBODIMENT

Figure 1:
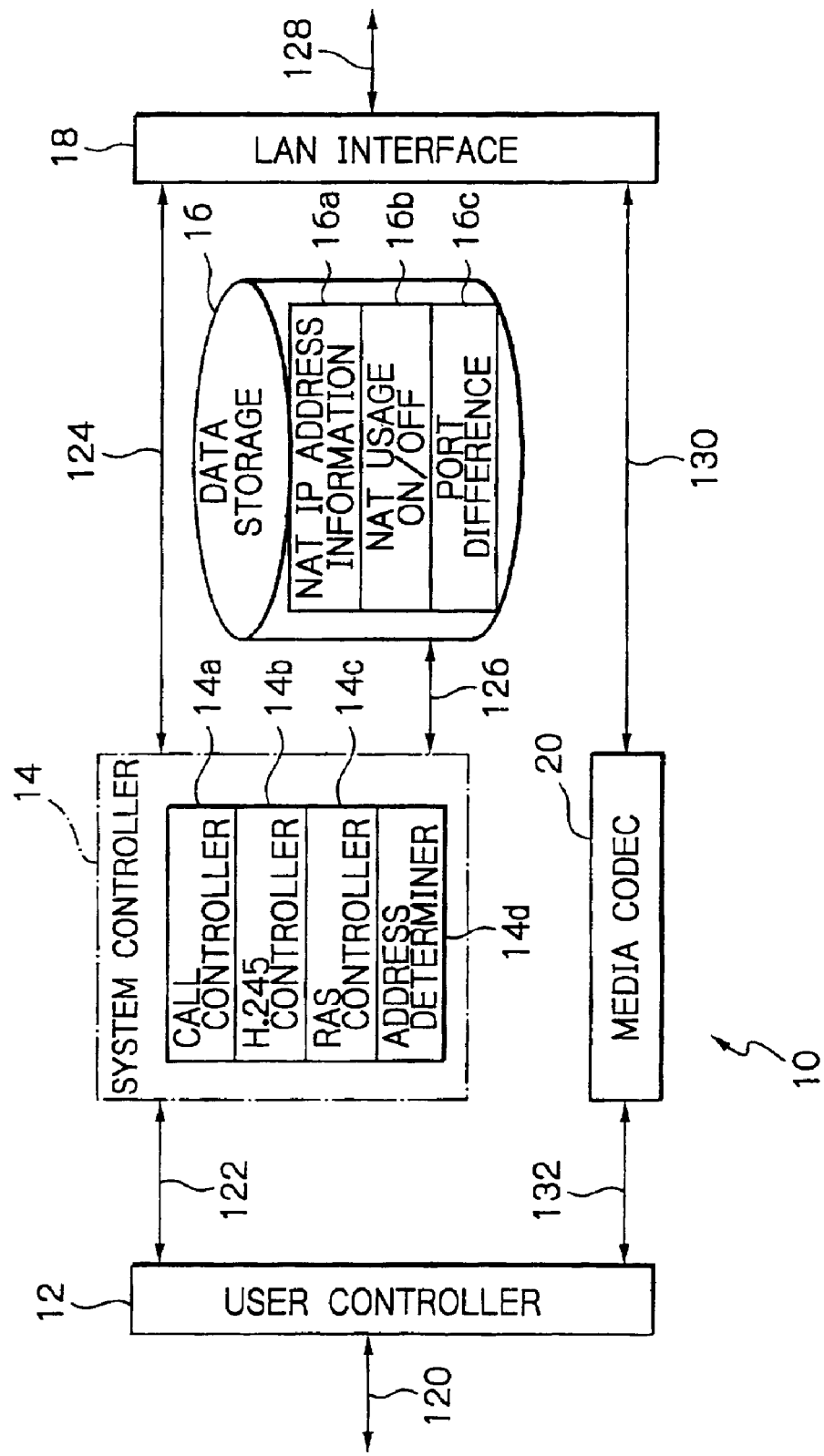
FIG. 1 is a schematic block diagram showing the general configuration of an embodiment of multimedia communication apparatus to which a communication apparatus with an address translation function is applied according to the present invention.

With reference to the attached drawings, an embodiment of a communication apparatus with the address translation function according to the present invention will be described.

In this embodiment, a multimedia communication apparatus 10, to which the communication apparatus with the address translation function of the present invention is applied, will be described. The components not related directly to the present invention are omitted in the figures and the description. The reference numeral of a signal is represented by the reference numeral of a line on which the signal flows.

As shown in FIG. 1, the multimedia communication apparatus 10 comprises a user controller 12, a system controller 14, a data storage 16, a LAN interface 18, and a media codec 20. As will become apparent in the description below, the multimedia communication apparatus 10 allows a plurality of clients in a LAN to communicate with devices in a different address space.

The multimedia communication apparatus 10 in this embodiment is configured such that its operation conforms to the ITU-T Recommendation H.323 standard (Ver. 2, February 1998). The ITU-T Recommendation H.323 standard defines the voice data, video data, and text data communication standards for terminals on a LAN where service quality is not guaranteed. These standards also include Recommendation H.225.0 (Ver. 2, November 1998) that defines multiplexing and synchronization control in a multimedia communication infrastructure, Recommendation H.245 (Ver. 3, January 1998) that defines a control protocol for multimedia communication, and Recommendation Q.931 (March, 1993) that describes a D-channel call connection procedure for the user network interface (UNI: User Network Interface) in an ISDN (Integrated Services Digital Network).

The user controller 12 is connected by a signal line 120 to a plurality of devices (clients), not shown, each including an application program. The user controller 12 receives source information, destination information, and call instructions from the devices and sends them to the system controller 14. In addition, upon receiving a message, the user controller 12 notifies the system controller 14 of a receive-message instruction. The user controller 12 communicates with the system controller 14 via a signal line 122.

The system controller 14 comprises a call controller 14a, an H.245 controller 14b, a RAS (Registration, Admissions and Status) controller 14c, and an address determiner 14d. In particular, the address determiner 14d, the essential component of the present invention, is adapted to check if the NAT (Network Address Translation) function is on or off and, based on source information and destination information, determine which IP address is to be set in a call message. The address determiner 14d outputs the call message, including the determined IP address, to the LAN interface 18 over a signal line 124.

The data storage 16 is a recording/reproducing device, such as a hard disk, a magneto-optical disk, or a semiconductor memory. The data storage 16 stores, in advance, NAT IP address information 16a, NAT operation indication information (on/off) 16b that indicates whether or not the apparatus will perform IP address translation through the NAT for each client in order to create local device information, and port difference information 16c for uniquely identifying a port even if the same port number is shared by clients. The system controller 14 reads out the information described above via a signal line 126.

The LAN interface 18 converts the voltage level of the multimedia communication apparatus 10 to that compatible with an IP network. Upon receiving a message from the network, the LAN interface 18 converts the voltage level of received data back to the voltage level of the apparatus. The LAN interface 18 sends out this call message to an IP network 128. The LAN interface 18 is connected to the media codec circuit 20 by a signal line 130.

The media codec 20 is adapted to encode/decode data according to the type of multimedia data that is communicated with. To perform this function, the media codec 20 is connected also to the user controller 12 by a signal line 132.

A server may be adapted to have an address which has been translated from a private address to a global address through the NAT or the IP masquerade function.

By the way, FIG. 2 shows an example of the structure of an IP packet 30 output from the multimedia communication apparatus 10. The IP packet 30 comprises an IP header 32 and a data part or filed 34. The data part 34 begins with a TCP (Transmission Control Protocol) header 36.

The IP header 32 has a filed 32a containing a source IP address, and a filed 32b containing a destination IP address.

The TCP header 36 has a filed 36a containing a source port number, and a filed 36b containing a destination port number. It is known that an IP packet with this structure makes IP transparency incomplete when an IP address is translated by the NAT function.

Figure 3A:
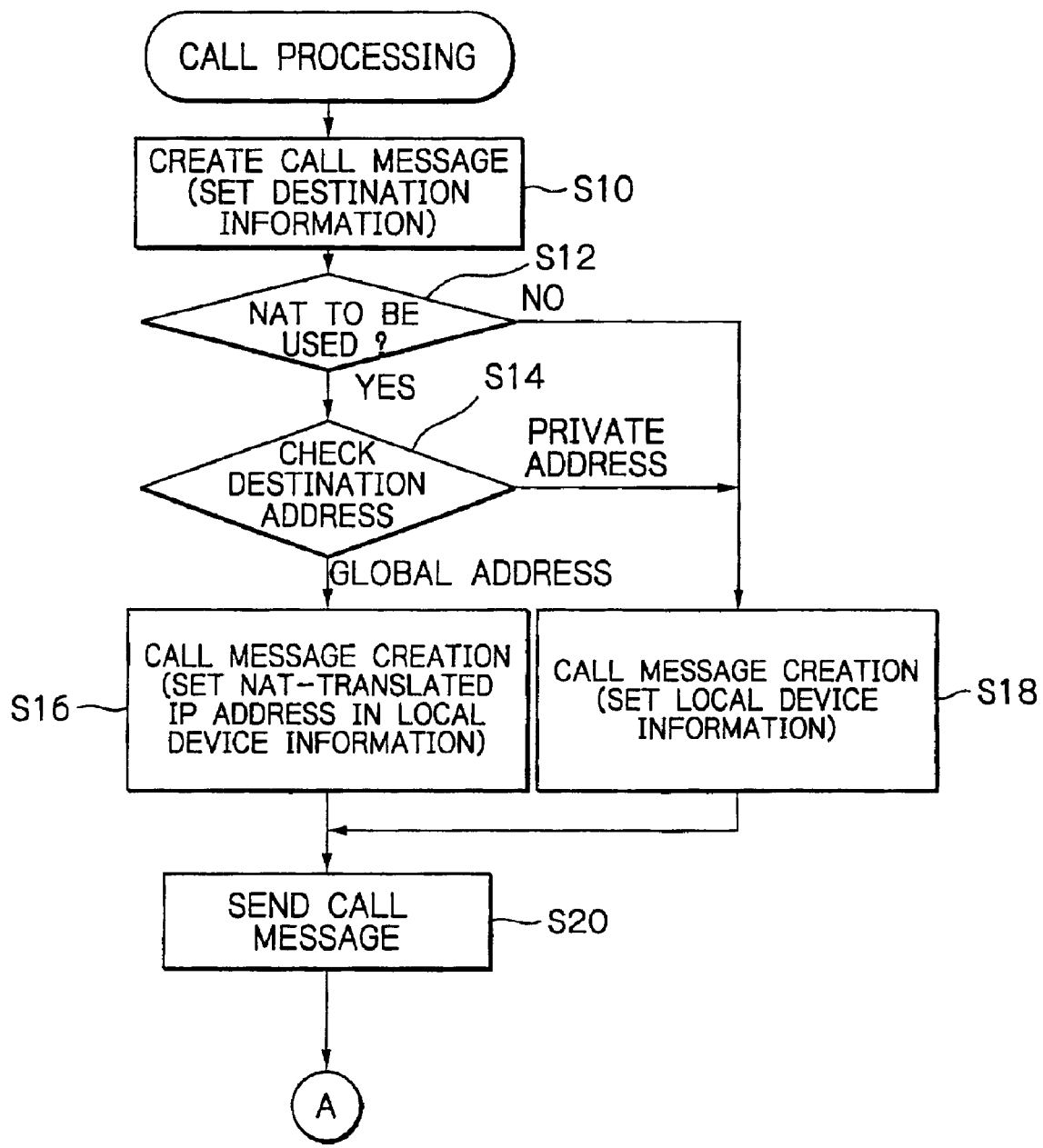
FIGS. 3A and 3B are a flowchart in combination exemplifying the operation procedure of call processing performed by the multimedia communication apparatus shown in FIG. 1.
Figure 3B:
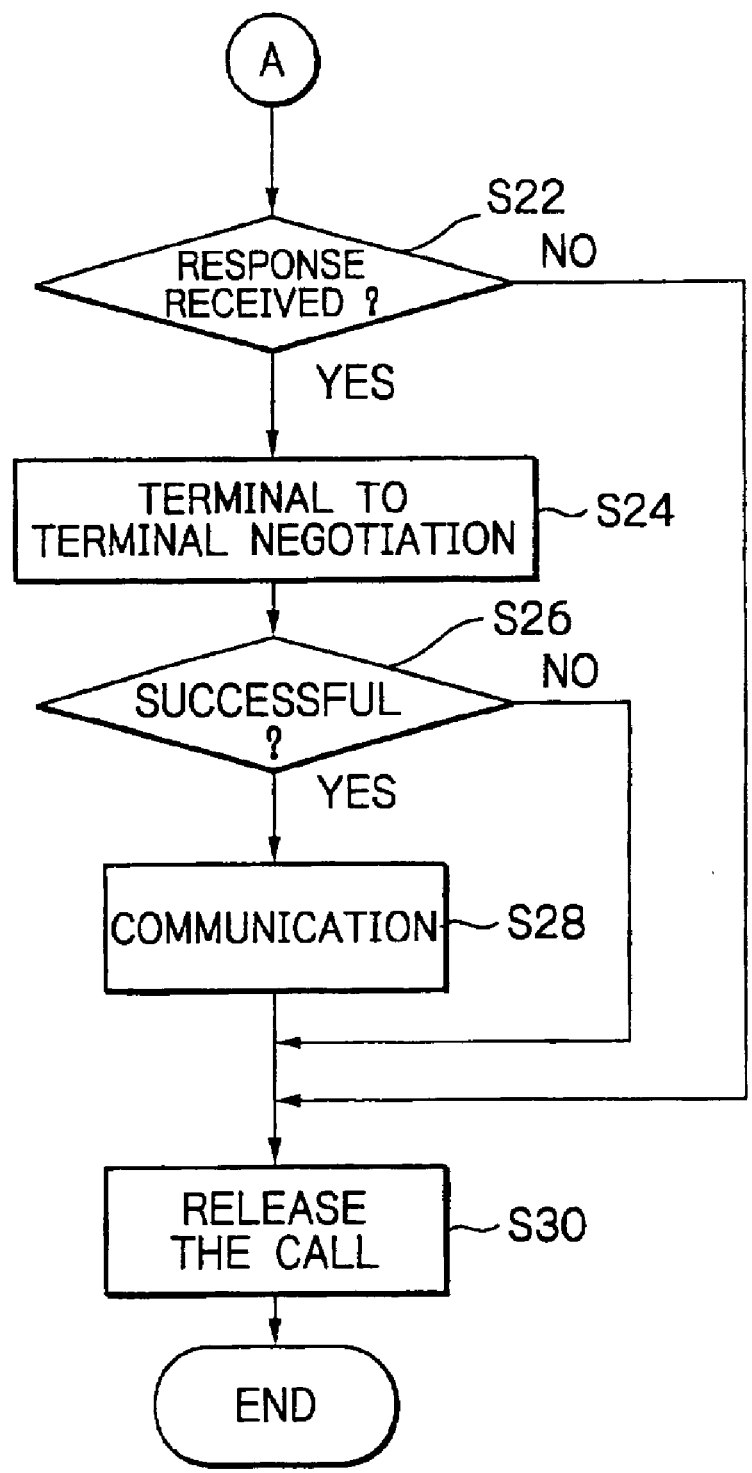

The multimedia communication apparatus 10 operates according to the present invention as described below. In particular, the following describes the procedure for preventing a communication failure, caused by the structure of an IP packet, with the use of the NAT/IP masquerade function during call processing, FIG. 3. The important point in this call processing is that, if the destination address at negotiation connection open or multimedia data transmission is a global address as a result of client IP address translation, the corresponding client may be identified by the destination IP address specified at response. The client, if identified correctly at response, enables communication to be performed correctly.

First, a client (device), which has a send-message request, sends out destination information to the user controller 12. The user controller 12 sends out received source information, destination information, and a call instruction to the system controller 14 (step S10). In response, the system controller 14 sets the destination (remote terminal) IP address and the destination (receiving) port number in a call message, first assuming that the message will be sent to a typical web.

Next, the system controller 14 reads out the NAT operation indication information 16b on this client from the data storage 16 to determine how to generate the call message (step S12).

The address determiner 14d receives the operation indication information 16b that has been read out and checks to see if the NAT is to be used (on, YES) or not (off, NO).

Next, the system controller 14 checks which address is used for the destination IP address (step S14) and, based upon the address used, determines which IP address will be used as the local device information in the call message. More specifically, if the destination IP address is a global address, control is passed to step S16. In this case, the apparatus 10 sets the IP address, which is assigned by the NAT of the apparatus 10, in the call message (sets the global address that has been translated through the NAT). If the destination IP address is a private address, control is passed to step S18. In this case, the apparatus 10 sets the private address of the client, which is stored in the data storage 16, in the call message (sets the local device information).

Next, the system controller 14 sends out the call message, which has been set up, to the LAN interface 18, creates a TCP header and an IP header from the local device information, adds those headers to the message, and sends out the message to the remote device, not shown, over the IP network 128 (step S20). The remote device generates a response message corresponding to the received call message and sends back the response message. The LAN interface 18 saves the local device information when a connection is established for controlling the call.

This processing, though not shown, will be described more specifically. The LAN interface 18 of the remote device (for example, server) receives the message over the IP network 128. Upon receiving the message, the LAN interface 18 sends a receive-message notification to the system controller. The system controller, in turn, informs the user controller of message reception. The user controller checks if it is possible to send messages and, if possible, sends a receive-message instruction to the system controller.

In response to this instruction, the system controller saves the information on the calling party in the device, for example, sets the local device information, stored in the storage, in the response message.

The IP header of the response message comprises the source IP address (more specifically, server IP address) and the destination IP address (client IP address). The destination IP address in this embodiment is either a global address produced by IP address translation (NAT translation) or a private address as described above.

Next, the multimedia communication apparatus 10 checks if it has received the response message from the device to which the call message was sent (step S22). The apparatus 10 receives the response message through the LAN interface 18 and sends this response message to the system controller 14. The system controller 14 analyzes the received response message and performs call connection processing (YES in step S22). As a result of response message analysis, the message has the source IP address and the destination IP address described above. Thus, call connection processing is performed smoothly. Therefore, the response message is delivered to the call device safely.

After a call connection is established successfully, the system controller 14 negotiates with the remote device based on the local terminal information (step S24). In the negotiation, the information on the remote device (IP address and port number) provided by the response message is used.

Next, the system controller 14 checks if the negotiation between the terminals has been completed successfully (step S26). If the negotiation has been completed successfully (YES), the system controller 14 informs the user controller 12 that the call request has been completed. In response to the information indicating that the call request has been completed, the user controller 12 sends client-supplied voice data, video data, or text data to the media codec 20. The media codec 20 encodes or decodes the voice data, video data, or text data as the data is sent or received.

In response to coded data from the media codec 20, the LAN interface 18 sends out the coded data to the IP network 128. Conversely, in response to coded data from the IP network 128, the LAN interface 18 sends the data to the media codec 20 for decoding (step S28: Communication). Device information (IP address and port number) used for multimedia data transmission and reception is transmitted by the call message and response message or through negotiation.

If there is no response from the remote device after completion of the communication (NO in step S22) or if the negotiation fails (NO in step S26), the call is released (step S30). Thus, the call processing is terminated.

The basic principle of the above-described call processing operation will be described briefly in terms of a communication protocol hierarchy, see FIGS. 4A and 4B. As shown in FIG. 4A, the hierarchy in a private address space is usually divided into the Ether layer 40P, IP layer 42P, TCP layer 44P, and the Q.931 layer 46P that are on the communication protocol. Similarly, the global address space is divided into the Ether layer 40G, IP layer 42G, TCP layer 44G, and the Q.931 layer 46G. Packet address translation is performed with a private address at the IP layer 42P and the Q.931 layer being PI1.

In this case, the address at the TCP transport layer or below is translated using the NAT, but the IP address at the higher layer Q.931 (application layer) is not. This makes the data in the packet in the global address space inconsistent. More specifically, in the same packet, the address data at the IP layer (network layer) is GI1 and the address data at the Q.931 layer is PI1. At the higher layer of the remote terminal, the address data PI1 at the Q.931 layer is recognized as the IP address and, therefore, an attempt is made to send the packet to PI1 in the global address space. Therefore, communication is not established correctly.

In this embodiment, if it is known that the remote terminal is in the global address space, the apparatus 10 uses the IP address data GI1, which has been translated using the NAT, in the private address space for the IP address at the Q.931 layer, FIG. 4B. Even if address translation is performed at the TCP layer 44P or below, the IP address at the Q.931 layer in the global address space may be provided as GI1. Therefore, the inconsistency in the data contents is avoided and communication may be established correctly.

As in the operation procedure described above, the apparatus 10 makes two addresses available as the local device information on a client: a normal network address (private address) and a global address that has been generated through NAT translation. This allows a device at a private address to communication with a device at a global address. That is, a device at a private address may communicate also with a device not on the same private network. This means that a device may communicate with any other device that is on an IP network and that conforms to the same communication protocol.

Figure 5:
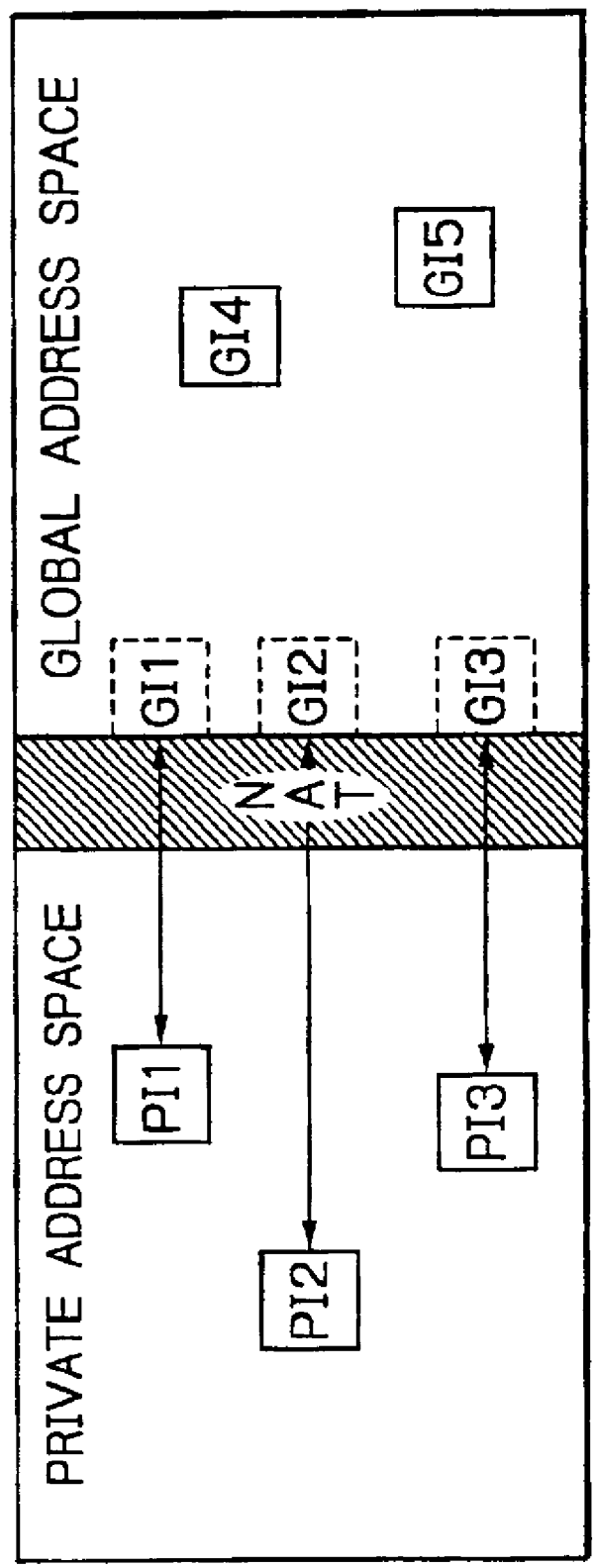
FIG. 5 is a schematic diagram useful for understanding the concept of a static NAT used by the multimedia communication apparatus shown in FIG. 1.

The multimedia communication apparatus 10 is designed such that IP address translation is performed for data, which is transferred between global networks, using the IP addresses stored in the NAT IP address information 16a in the data storage unit 16. This translation is called static translation, FIG. 5. The IP addresses in the NAT IP address information 16a are the previously-allocated IP addresses of virtual device GI1, GI2, and GI3 enclosed by broken lines. For example, device GI4 at a global address can communicate with device PI1 at a private address as if it were communicating with device GI1.

When the static IP masquerade function is used, only one global address need be used for translation. When communicating between devices (called clients) in the private address space and devices (called servers) in the global address space on a one-to-one basis, there is no problem in communicating with device GI1, which is virtually setup in the global address space, through the IP masquerade function.

Figure 6:
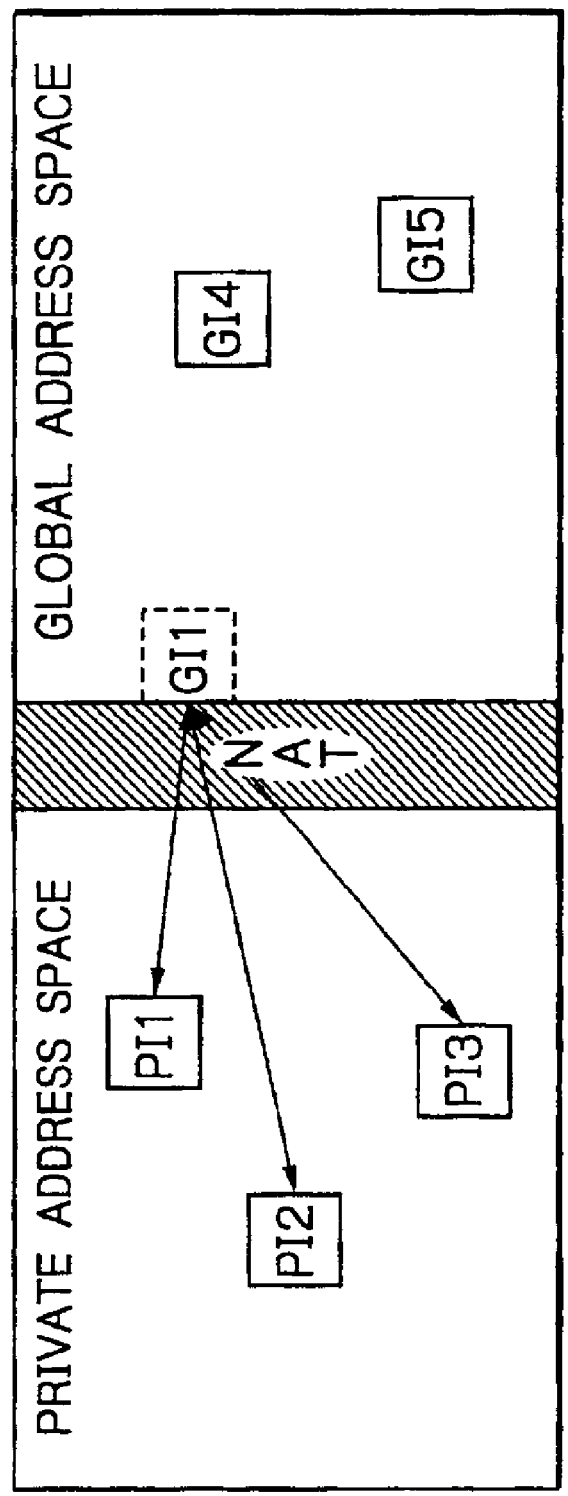
FIG. 6 is a schematic diagram useful for understanding the concept of a static IP masquerade function used by the multimedia communication apparatus shown in FIG. 1.

However, in some cases, a plurality of clients communicate with device GI1 at the same time (see FIG. 6). In this case, the port numbers which are translated by the IP masquerade function and which are used by devices at global addresses may overlap. In other words, when the devices PI1, PI2, and PI3 communicate with devices GI4 and GI5 at the same time, it appears as if device GI1 were communicating with devices GI4 and GI5. In this case, the port numbers overlap each other because the port number used by each device in the private address space is used directly as the port number of device GI1.

To prevent this overlap, it is desirable that different port numbers be assigned to the devices PI1, PI2, and PI3. Different port numbers need not be assigned to the devices if they communicate only with a device on the private network. Although all devices (clients) on a private network and capable of communicating with devices on a global network should preferably have different port numbers, this port number assignment task would require much effort.

To solve the problem of this port number assignment, the data storage 16 is provided with additional information, the port difference information 16c, FIG. 1. The port difference information 16c includes a value by which a port number of a device is to be shifted. When a port number is assigned, the port difference information 16c is added to the port number to generate a new port number. The user may specify any value for this port difference information 16c. This information prevents a port number from overlapping.

Figure 7A:
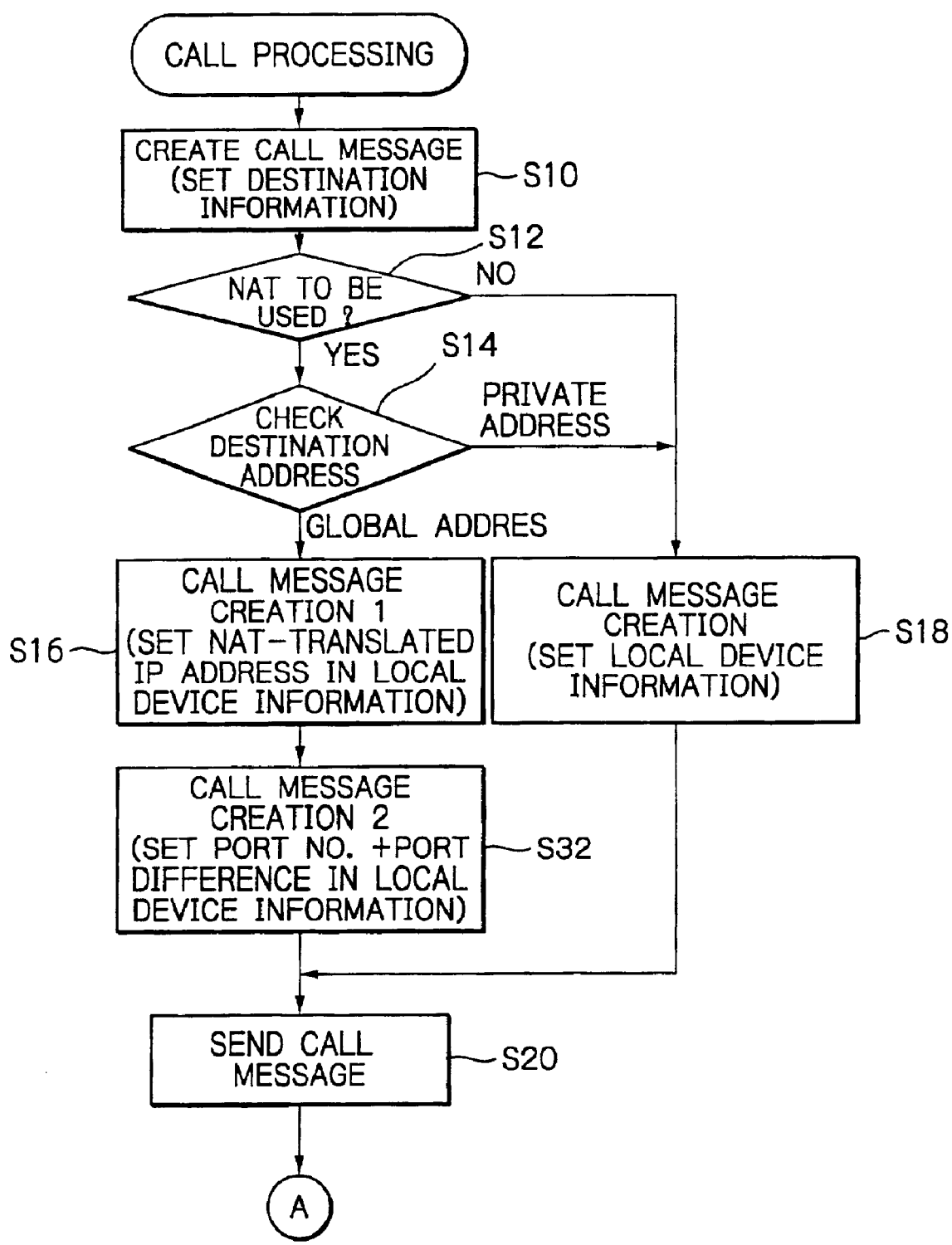
FIGS. 7A and 7B are a flowchart in combination exemplifying the operation procedure of call processing, shown in FIGS. 3A and 3B, to which a step of the static IP masquerade function is added.
Figure 7B:
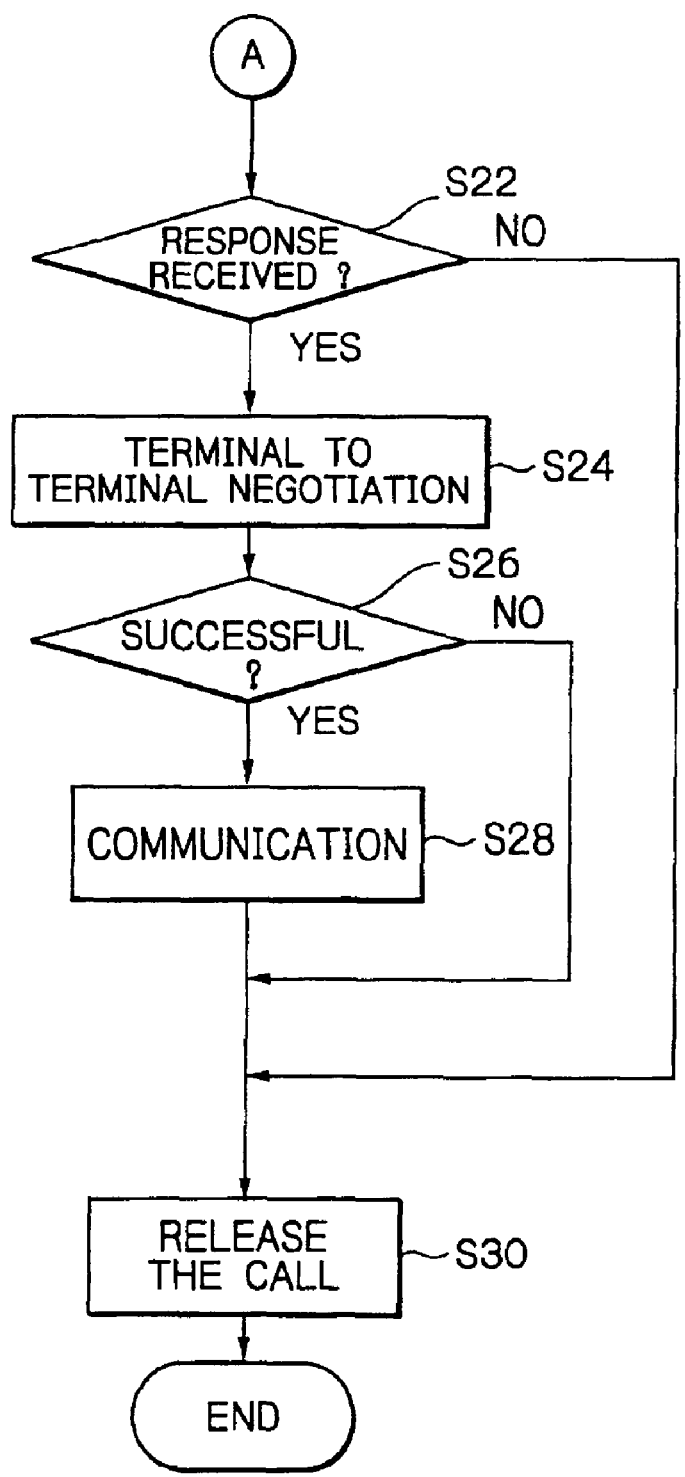

The operation procedure for generating a new port number will be described briefly, with reference to FIGS. 7A and 7B. The same step number is used for a step that is found also in the flowchart in FIGS. 3A and 3B. In this call processing, a new processing step S32 is added to assign a new port number. This new step S32 is added between the step in which a NAT-translated global address is set in the local device information as the IP address after the address of the destination is found to be a global address (step S16) and the step in which the call message is sent (step S20). In the added processing step S32, the system controller 14 reads out a port number and port difference information 16c from the data storage 16 and adds them up to generate a new port number. The system controller 14 sets this port number in the local device information.

When device PI1 communicates with device PI2, it uses the port number set up for the device (PI1) for all connections. When device PI1 communicates with device GI4, it uses a port number, generated by shifting the port number set up for the device (PI1) by the value of the port difference information 16c, for all connections (In this case, NAT translation is also performed as described earlier).

As described above, the apparatus 10 has local device information in which two addresses, a normal network address and a global address translated through the NAT, are available for each device and, at the same time, shifts a port number by a predetermined value. This configuration allows a plurality of communications to be performed between devices at private addresses and devices at global addresses. Therefore, a device on the Internet and conforming to the same communication protocol may communicate with any other device.

In contrast to the embodiment described above, the port numbers of the devices on a private network may be changed at a time when the devices communicate with devices on a global network in order to prevent the port numbers of the devices from being overlapped.

In the description of the embodiment, the present invention is applied to the multimedia communication apparatus 10 conforming to the general ITU-T Recommendation H.323. The embodiment may also be implemented under software control.

By configuring the apparatus as described above, a private address and a global address used for NAT translation are provided and one of them is saved in the local device information to establish a correspondence with an IP address in a response message. This configuration enables multimedia data to be communicated between the devices that are in different address space. To solve the problem of port number overlapping caused by the IP masquerade function, the port difference information is added to generate a new port number to be used for multimedia communication. This configuration makes multimedia communication possible with no port number overlapping.

The entire disclosure of Japanese patent application No. 2000-345034 filed on Nov. 13, 2000, including the specification, claims, accompanying drawings and abstract of the disclosure is incorporated herein by reference in its entirety.

While the present invention has been described with reference to the particular illustrative embodiment, it is not to be restricted by the embodiment. It is to be appreciated that those skilled in the art can change or modify the embodiment without departing from the scope and spirit of the present invention.

What is claimed is:

1. A communication apparatus with an address translation function located between terminals, which communicate over an IP (Internet Protocol) network, for processing different types of data for communication, wherein in the IP network an address uniquely identifying a called party is a first address and an address used in a closed network is a second address, said apparatus comprising:

a first control circuit that sends destination information indicating a destination and a call instruction, which are included in the data, and a reception instruction;

an information storage that stores therein the first address to which the second address is made to correspond with IP address translation, information indicating which address, first or second, is to be set in the call instruction and the reception instruction, and port information used for identifying applications;

a second control circuit that determines which address, first or second, is set as a destination address in a call message generated based on information read out from said information storage and that performs control according to a standard;

a codec circuit that performs codec processing for supplied data; and an interface circuit that connects the IP network to said apparatus.

2. The apparatus in accordance with claim 1, wherein said apparatus conforms to Recommendation H.323 of International Telecommunication Union Telecommunication Standardization Sector (ITU-T).

3. The apparatus in accordance with claim 2, wherein said second control circuit comprises:

a call control circuit;

an H.245 control circuit that conforms to a standard of Recommendation H.245 of International Telecommunication Union Telecommunication Standardization Sector (ITU-T);

a RAS control circuit that controls a registration, admission, and status of the information; and an address determination circuit that determines which address, first or second, is to be set up for the destination address.

4. The apparatus in accordance with claim 3, wherein said information storage contains a value as port difference information, said value being used for shifting a port number to uniquely identify each device even if the port information is the same.

5. The apparatus in accordance with claim 2, wherein said information storage contains a value as port difference information, said value being used for shifting a port number to uniquely identify each device even if the port information is the same.

6. The apparatus in accordance with claim 1, wherein said second control circuit comprises:

a call control circuit;

an H.245 control circuit that conforms to a standard of Recommendation H.245 of International Telecommunication Union Telecommunication Standardization Sector (ITU-T);

a RAS (Registration, Admissions, and Status) control circuit that controls a registration, admission, and status of the information; and an address determination circuit that determines which address, first or second, is to be set up for the destination address.

7. The apparatus in accordance with claim 6, wherein said information storage contains a value as port difference information, said value being used for shifting a port number to uniquely identify each device even if the port information is the same.

8. The apparatus in accordance with claim 1, wherein said information storage contains a value as port difference information, said value being used for shifting a port number to uniquely identify each device even if the port information is the same.

9. A multimedia communication method of processing different types of data over an IP network and of performing a plurality of types of data communication between terminals while using an IP address translation function, wherein in the IP network an address uniquely identifying a called party is a first address and an address used in a closed network is a second address, said method comprising:

a first step of setting destination information of a call destination, one of the terminals being the call destination;

a second step of determining if address translation is to be performed for an address included in a call message created based on the destination information;

a third step of determining if the determined destination is represented by the first address or the second address;

a fourth step of setting an IP address, produced by the address translation, in local device information unique to the terminal when the determined result indicates the first address;

a fifth step of setting the local device information when the determined result indicates the second address;

a sixth step of sending the call message set up in the above steps;

a seventh step of checking if a response message is received from another terminal;

an eighth step of performing negotiation between the terminals in response to the reception;

a ninth step of checking if the negotiation is successful;

a tenth step of communicating data between the terminals when the negotiation is successful and for performing codec processing on the data sent or received; and an eleventh step of releasing the call if, after completion of the communication, the response message was not received or the negotiation failed.

10. The method in accordance with claim 9, wherein said fourth step comprises the sub-steps of:

setting the IP address, produced by the address translation, in the local device information unique to the terminal; and setting port information used for identifying each terminal.

11. The method in accordance with claim 10, wherein the port information uses a port number identifying each terminal and a port difference that is assigned by shifting the local terminal port number by a predetermined value.

* * * * *